United States Patent
English, Jr. et al.

(10) Patent No.: US 7,008,065 B2
(45) Date of Patent: *Mar. 7, 2006

(54) COLOR COMPONENT APERTURE STOPS IN PROJECTION DISPLAY SYSTEM

(75) Inventors: R. Edward English, Jr., Cincinnati, OH (US); Sean M. Donnelly, Portland, OR (US); Simon Magarill, Cincinnati, OH (US); Arlie Richard Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/074,167

(22) Filed: Mar. 7, 2005

(65) Prior Publication Data

US 2005/0151939 A1 Jul. 14, 2005

Related U.S. Application Data

(63) Continuation of application No. 10/337,747, filed on Jan. 7, 2003, now Pat. No. 6,877,865.

(51) Int. Cl.
*G03B 21/00* (2006.01)
*G03B 21/14* (2006.01)
*G03B 21/20* (2006.01)
*G02F 1/1335* (2006.01)
*F21V 5/00* (2006.01)

(52) U.S. Cl. .................. 353/97; 31/38; 31/81; 31/102; 349/8; 362/331

(58) Field of Classification Search .................. 353/31, 353/33, 34, 37, 38, 84, 94, 97, 102, 81; 349/5, 349/7, 8, 61, 62; 359/577; 362/331
See application file for complete search history.

(56) References Cited

U.S. PATENT DOCUMENTS 5,327,270 A 7/1994 Miyatake .................... 359/63
5,607,216 A 3/1997 Kaneko et al. ............... 353/97

(Continued)

FOREIGN PATENT DOCUMENTS

EP 0 710 036 A2 5/1996

(Continued)

OTHER PUBLICATIONS

Arnold, et al., "An Improved Polarizing Beamsplitter LCOS Projection Display Based on Wire-Grid Polarizers", *SID 01 Digest*, p. 1282-1285.

(Continued)

*Primary Examiner*—Melissa Jan Koval
(74) *Attorney, Agent, or Firm*—George W. Jonas

(57) ABSTRACT

A projection display system employs one or more color modifying aperture stops, such as apodizing aperture stops, to provide high contrast, balanced color and high throughput. One projection system includes a reflective liquid crystal-on-silicon light valve positioned with a polarizing beam splitter, such as a wire grid polarizing beam splitter, for each of the primary color component light paths to separately impart image information into each of the primary color components of light. A color combiner receives and combines the primary color components of light with imparted image information to provide light representing a polychromatic display image. At least one aperture stop is positioned along at least one of the primary color component light paths to balance relative intensities of the primary color components of light.

20 Claims, 7 Drawing Sheets

U.S. PATENT DOCUMENTS

| | | | |
|---|---|---|---|
| 5,743,612 A | 4/1998 | Matsuda et al. | 353/97 |
| 5,800,033 A | 9/1998 | Funanami et al. | 353/97 |
| 5,826,959 A | 10/1998 | Atsuchi | 353/20 |
| 5,924,783 A * | 7/1999 | Jones | 353/97 |
| 6,113,239 A | 9/2000 | Sampsell et al. | 353/31 |
| 6,122,103 A | 9/2000 | Perkins et al. | 359/486 |
| 6,309,071 B1 | 10/2001 | Huang et al. | 353/31 |
| 6,447,120 B1 | 9/2002 | Hansen et al. | 353/30 |
| 6,456,435 B1 * | 9/2002 | Cobb et al. | 359/577 |
| 6,467,911 B1 | 10/2002 | Ueyama et al. | 353/87 |
| 6,631,997 B1 | 10/2003 | Miyata et al. | 353/97 |
| 6,726,334 B1 * | 4/2004 | Ishino | 353/84 |
| 6,877,865 B1 * | 4/2005 | English et al. | 353/97 |
| 6,886,945 B1 * | 5/2005 | Nishida et al. | 353/97 |
| 2002/0171809 A1 | 11/2002 | Kurtz et al. | 353/20 |
| 2003/0193650 A1 | 10/2003 | Sugawara | 353/31 |

FOREIGN PATENT DOCUMENTS

| | | |
|---|---|---|
| EP | 1 006 734 A2 | 6/2000 |
| JP | 08146519 | 7/1994 |
| WO | WO 01/55774 A2 | 8/2001 |

OTHER PUBLICATIONS

Robinson, et al., "High Contrast Color Splitting Architecture Using Color Polarization Filters", *SID 00 Digest* p. 92-95.

"ProFlux™ PBS with LCOS", MOXTEK, Inc. Orem, UT, USA [on line] <http://www.Profluxpolarizer.com> [document dated May 2002].

"ProFlux™ in LCD Projectors", MOXTEK, Inc. Orem, UT, USA [on line] <http://www.Profluxpolarizer.com> [document dated May 2002].

* cited by examiner

COLOR COMPONENT APERTURE STOPS IN PROJECTION DISPLAY SYSTEM

CROSS REFERENCE TO RELATED APPLICATIONS

This application claims priority from Application Ser. No. 10/337,474 filed Jan. 7, 2003 which claims priority to Provisional Application No. 60/347,103 filed on Jan. 7, 2002, the entire disclosure of Application Ser. No. 10/337,474 is considered as being part of the disclosure of the current application and is hereby incorporated by reference herein.

The present invention relates to electronic projector optical systems and, in particular, to employing shaped aperture stops to improve color balance and image contrast.

BACKGROUND AND SUMMARY OF THE INVENTION

Various arrangements of optical layouts are known for projection system with reflective liquid crystal displays. Examples are described in U.S. Pat. Nos. 6,309,071 and 6,113,239 and in High Contrast Color Splitting Architecture Using Color Polarization Filters, Michael G. Robinson et al, SID 00 Digest, p. 92–95. One optical layout described in the Robinson et al. article employs proprietary polarization filter technology (i.e., ColorSelect™ polarization filter technology), available from ColorLink, Inc. of Boulder, Colo, USA, to achieve a reported contrast of more than 500:1.

However, contrast in these known systems is limited due to use of MacNeille prisms as the polarization beam splitters (PBSs) in different arrangements. A MacNeille prism PBS has limited contrast due to skew-ray depolarization effects, as described in U.S. Pat. No. 5,327,270. The depolarized light reduces the contrast of reflective electronic projection displays, and particularly those employing liquid crystal-on-silicon (LCOS) light valves. As described in the '270 patent, compensation for the skew-ray depolarization requires an additional quarter-wave plate, which increases cost, requires precision alignment and restricts the range of operating temperatures.

Generally, reflective liquid crystal on silicon (LCOS) light valves have several advantages for use in projection displays, including small pixel size, high aperture ratio, and fast response. As the numerical aperture (NA) of a system using reflective light valves is increased to maximize image brightness, however, contrast decreases. This reduction in contrast is largely due to the interaction between the non-ideal retardance of the light valves and compound angle depolarization by the tilted polarizing beamsplitters (PBSs) typically used in such systems; the contrast varying approximately with the inverse square of the numerical aperture. In addition to reduced contrast, increased NA results in poorer image quality due to increased geometric aberration in the projection lens.

Another limitation of conventional systems is the color temperature or balance of the light. Projection systems typically require a lamp with long lifetime and extremely small source of light, such as is provided by high-pressure mercury lamps (e.g., UHP type, available from Philips Electronics). These lamps produce a discontinuous spectrum and are relatively deficient in one or two primary colors, requiring at least one of the primaries (typically green, and sometimes green and blue) be attenuated to obtain an acceptable white point. This is typically done by limiting that primary to a narrower bandwidth than required to obtain a satisfactory color gamut. For example, the color separation filters are modified to reduce the spectral width of the green and blue primaries, causing them to become more saturated than those specified in the SMPTE broadcast standard and restricting their dynamic range.

Accordingly, the present invention provides high contrast, balanced color and high throughput in a wide variety of electronic projectors, such as a multi-path, reflective liquid crystal-on-silicon (LCOS) projection display system.

In one implementation, a reflective liquid crystal-on-silicon projection system includes an illumination system that generates polychromatic light. A color separation system, such as a cross-dichroic, is positioned to receive the polychromatic light and to separate it into primary color components of light that are directed along separate primary color component light paths. At least one color modifying (e.g., balancing) aperture stop is positioned along at least one of the primary color component light paths to balance relative intensities of the primary color components of light.

A reflective liquid crystal-on-silicon light valve is positioned with a polarizing beam splitter, such as a wire grid polarizing beam splitter, for each of the primary color component light paths to separately impart image information into each of the primary color components of light. A color combiner receives and combines the primary color components of light with imparted image information to provide light representing a polychromatic display image.

In another implementation, a color balancing aperture stop such as an apodizing aperture stop may be positioned to color balance the light before it is color separated. For example, the apodizing aperture stop may include an annular color filter corresponding to the primary color component of light of the primary color component light path in which the apodizing aperture stop is positioned.

The one or more aperture stops provide attenuation by reducing the numerical aperture (or increasing the F-number) of one or more primary color channels. The aperture stops may be implemented in various ways, including use of a smaller illumination system aperture stop, where a separate aperture stop location exists for each primary, or use of a smaller projection lens aperture stop, where separate projection lenses are used for each primary, or use of an annular color filter at the aperture stop of the illumination system or projection lens, where a common illumination system or projection lens is used for all primaries.

Additional description and implementations of the present invention will be apparent from the detailed description of the preferred embodiment thereof, which proceeds with reference to the accompanying drawings.

DETAILED DESCRIPTION OF PREFERRED EMBODIMENTS

Figure 1:
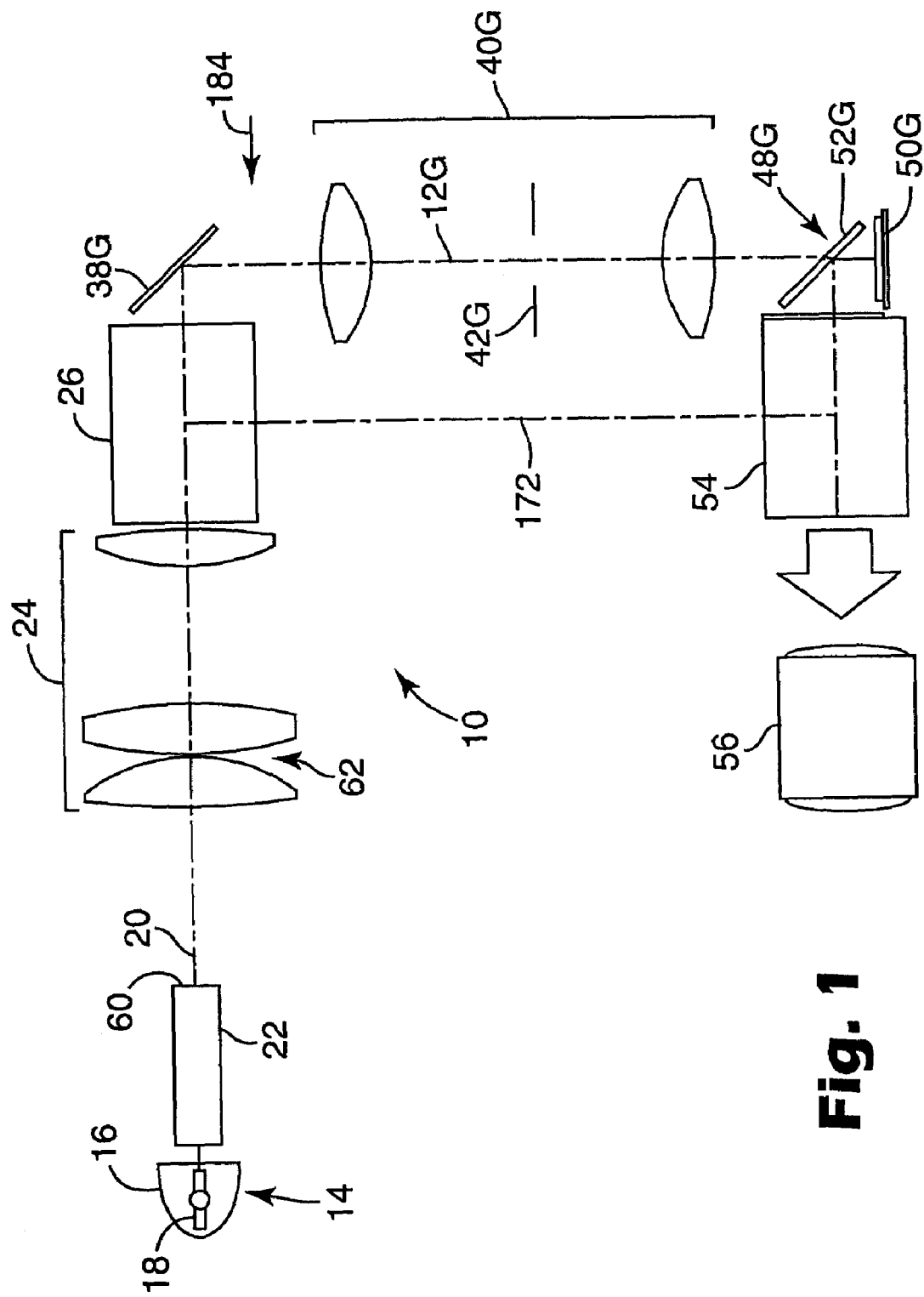
FIG. 1 is a diagram of an embodiment of a reflective projection display system according to the present invention.
Figure 2A:
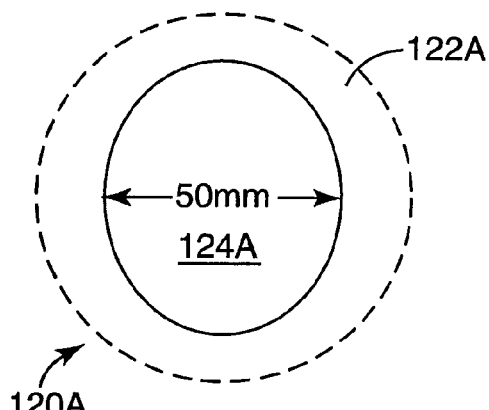
FIGS. 2A–2F are diagrams illustrating various alternative shaped aperture stops according to the present invention.
Figure 2D:
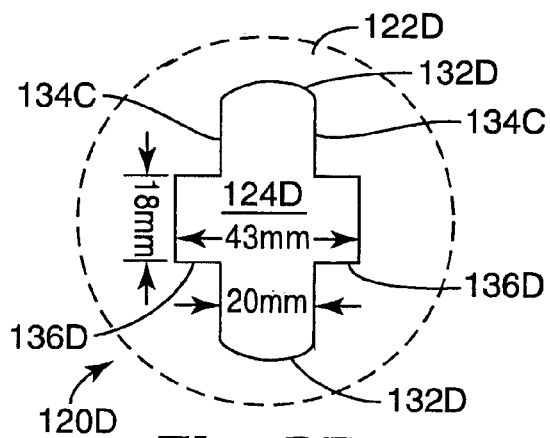
Figure 2B:
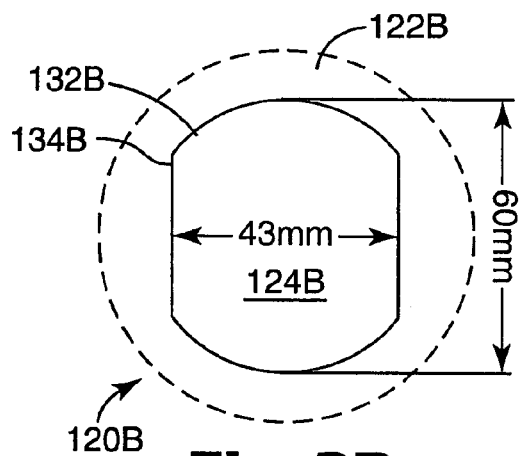
Figure 2E:
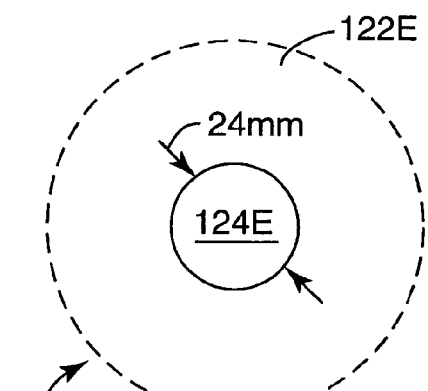
Figure 2C:
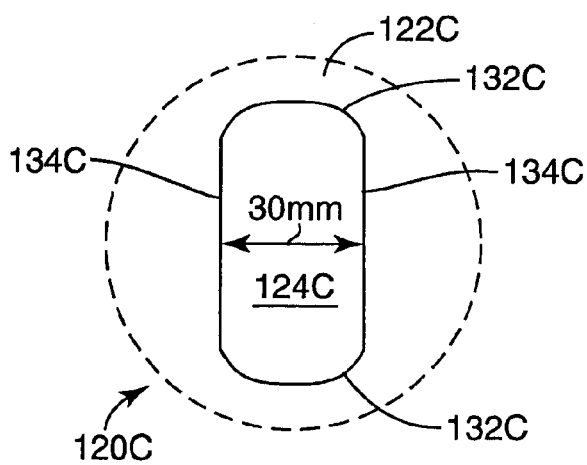
Figure 2F:
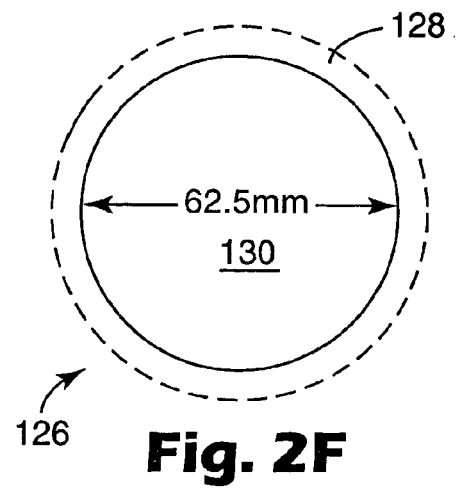

FIG. 1 is a diagram of an embodiment of a reflective projection display system 10 illustrating an example of an operating environment for the present invention. Projection display system 10 (sometimes referred to herein as projector 10) includes three color component optical paths 12 (only one shown) that correspond to the respective primary color light components red, green and blue. For purposes of clarity, FIG. 1 shows only one of the color component optical paths, which is designated color component optical path 12G to correspond to the green primary color component.

It will be appreciated that the red and blue color component optical paths will be the same as, but in places offset from, green color component optical path 12G. Elements of projector 10 that are specific to one primary color light component will be indicated by a corresponding alphabetic suffix (i.e., "R," "G," or "B"). Elements of projector 10 that are not specific to one primary color light component will not include such a suffix. Accordingly, the following description will be directed to the elements associated with the green color component, but will be similarly applicable to the elements associated with the red and blue color components.

An illumination system 14 having an elliptical reflector 16 and a wide spectrum (e.g., "white") light source 18 directs illumination light 20 through a light pipe integrator 22 (hollow or solid) and relay optics 24 to an illumination cross-dichroic 26.

Referring to FIG. 1, green optical path 12G passes from crossed-dichroic 26 and is directed by a fold mirror 38G through relay optics 40G and a color balancing aperture stop 42G according to the present invention. A polarizing beam splitter (PBS) 48G and a reflective light valve 50G, such as a liquid crystal-on-silicon (LCOS) LCOS light valve 50G, receive the light from color balancing aperture stop 42G. In one embodiment, polarizing beam splitter 48G includes a wire grid polarizer 52G, such as a ProFlux™ polarizer available from Moxtek, Inc. of Orem, Utah, USA. Such a wire grid polarizer 52G is described in U.S. Pat. No. 6,122,103. As implemented with wire grid polarizer 52G, PBS 48G may be referred to as a wire grid PBS 48G.

After being modulated by LCOS light valve 50G, the modulated green color component is reflected by LCOS light valve 50G back to wire grid polarizer 52G, which reflects the modulated green color component to an imaging cross-dichroic 54. Imaging cross-dichroic 54 is identical to illumination cross-dichroic 26 and functions to combine the red, green, and blue modulated color components and pass them to a projection lens assembly 56, which projects the full-color display image onto a display screen (not shown). Projector 10 may be operated in either a front projection format or a rear projection format.

Figure 3:
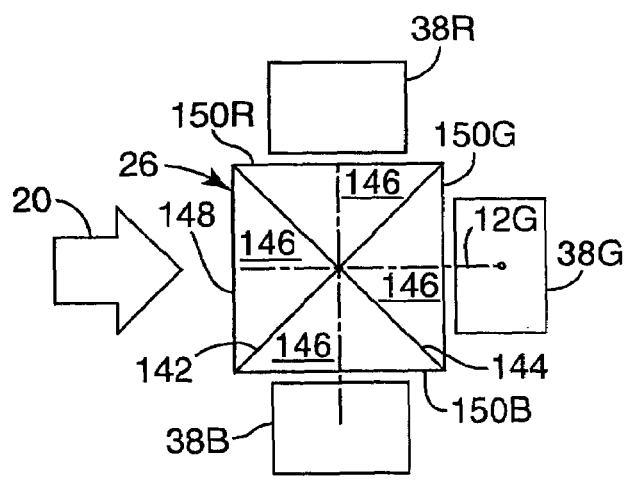
FIG. 3 is a top view of one implementation of an illumination cross-dichroic.

In operation, light from illumination system 14 passes through integrator 22, which creates a uniform intensity illumination distribution at an integrator exit window 60. Illumination cross-dichroic 26 splits the illumination light into three colors (red, green, and blue), which are directed to three separate LCOS light valves (only LCOS light valve 50G shown) by three identical sets of relay optics (only relay optics 40G shown) and three identical fold mirrors 38R, 38G, and 38B (FIG. 3). Relay optics 24 and color component relay optics (only 40G shown) create images of integrator exit window 60 at an optically active area of each LCOS light valve.

Color balancing aperture stop 42G functions to attenuate a primary color component (e.g., green) to obtain an acceptable white point. The attenuation is achieved by reducing the numerical aperture (NA) of that primary. The numerical aperture may be reduced in a variety of ways, including a smaller illumination system aperture stop, where a separate aperture stop location exists for each primary. In another implementation, a smaller projection lens aperture stop may be used, where separate projection lenses are used for each primary.

It will be appreciated that some projection systems that have a common illumination system or projection lens that is used for at least two primaries, rather than separate color component elements as in projection system 10. In these projection systems, an annular color filter at the aperture stop of the common illumination system or projection lens may be used to provide color balancing, as described below in greater detail.

This reduction in numerical aperture increases the contrast and image quality of that primary. Particularly in systems requiring attenuation of green light, such as those using high-pressure mercury lamps, the higher contrast and image quality in one primary significantly increases the visual perception of overall contrast and image quality.

FIGS. 2A–2F are diagrams illustrating various alternative shaped color balancing aperture stops 120A–120E according to the present invention that may be used as color balancing aperture stop 42G and any other color balancing aperture stop in projection system 10. (Aperture stops 120A–120E are sometimes referred to collectively as aperture stops 120.) Exemplary dimensions are indicated for shaped aperture stops 120 for purposes of illustrating exemplary proportional dimensions. It will be appreciated that the shaped aperture stops 120 could be formed with dimensions other than those indicated. As a basis for describing shaped aperture stops 120, a conventional aperture stop 126 is illustrated with an opaque face 128 and an exemplary circular aperture 130 with an exemplary diameter of 62.5 mm.

Shaped aperture stop 120A includes an opaque face 122A and a generally oval or elliptical aperture 124A. Shaped aperture stop 120B includes an opaque face 122B and a large cropped circular aperture 124B. Large cropped circular aperture 124B includes large opposed circular segments 132B that are positioned between a pair of straight-cropped sides 134B. Circular segments 132B are large in that they encompass larger circular segments of aperture 124B than do cropped sides 134B.

Shaped aperture stop 120C includes an opaque face 122C and a small cropped circular aperture 124C. Small cropped circular aperture 124C includes small opposed circular segments 132C positioned between a pair of straight-cropped sides 134C. Circular segments 132C are small in that they encompass smaller circular segments of aperture 124C than do cropped sides 134C.

Shaped aperture stop 120D includes an opaque face 122D and an alternative cruciform aperture 124D. Cruciform aperture 124D includes small opposed circular segments 132D positioned between a pair of straight-cropped sides 134D and transverse extensions 136D. Shaped aperture stop 120E includes an opaque face 122D and a small circular aperture 124E.

Table 1 lists optical throughput for each of shaped aperture stops 120, both in measured lumens and as a percentage of the throughput of conventional aperture stop 126 for a given light source (e.g., a 20 mm image at F/2.2).

TABLE 1

| | Lumens | % through |
|---|---|---|
| Standard | 3100 | 100% |
| Elliptical (120A) | 3060 | 99% |
| Big cropped (120B) | 2950 | 95% |
| Small cropped (120C) | 2500 | 81% |
| Cross (120D) | 2330 | 75% |
| Small Circle (120E) | 920 | 30% |

Table 1 illustrates the range of throughput variations that can be achieved with the various alternative shaped aperture stops 120. In addition, shaped aperture stops 120A–120D have elongated aspect ratios that to varying degrees preferentially block light at the extreme corners of the light bundle. Light at these corners is typically most subject to off-axis or skew rays (i.e. contrast or performance degrading light) or stray paths, so blocking light at these corners can provide a greater improvement in contrast.

Aperture stop 42G sets a working F-number, or numerical aperture, for the corresponding color component light path (e.g., green). Each color component light path includes a corresponding aperture stop. By using apertures with appropriate diameters the amounts of red, green and blue light can be controlled to provide a desired color temperature on the screen while increasing contrast.

An exemplary implementation of projection system 10 employs as light source 18 a high-pressure mercury lamp (UHP type), which has limited intensity in red. To obtain a desired color temperature (color coordinates for the white screen), the amount of green light is reduced by about 35%. With aperture stop 42R having a base F-number of 2.8, aperture stop 42G may be formed with an F-number of 3.5 to effect a 35% reduction in green light that will significantly increase the overall contrast of the panel. Hence, stop 42G functions to improve the contrast and image quality of projector 10 while preserving image or display brightness.

Some conventional color light-valve projection display systems use high intensity discharge (HID) light sources that produce a discontinuous spectrum and are relatively deficient in one or two primary colors. These systems require at least one of the primaries, typically green, to be attenuated to obtain an acceptable spectral balance or "white point." Typically, attenuation of such a primary color component is achieved by limiting that primary to a relatively narrow bandwidth to obtain a satisfactory color gamut.

For example, a rear-projection television system may use a high pressure mercury discharge lamp referred to as the "Ultra-High Performance" (UHP) lamp, available from Philips Electronics. The UHP lamp is relatively deficient in red and requires considerable attenuation of green and blue light to achieve an acceptable white point. This is typically done by modifying the color separation filters to reduce the spectral width of the green and blue primaries, causing them to become more saturated than those specified in the SMPTE broadcast standard and restricting their dynamic range.

FIG. 3 is a top view of one implementation of illumination cross-dichroic 26, which includes crossed dichroic coatings 142 and 144 positioned between inclined faces of a set of prisms 146, as is known in the art. Dichroic coatings 142 and 144 reflect and transmit different color components so that illumination light 20 received at an incident face 148 is separated into the color components reds, green and blue and directed out respective exit faces 150R, 150G, and 150B.

Figure 4:
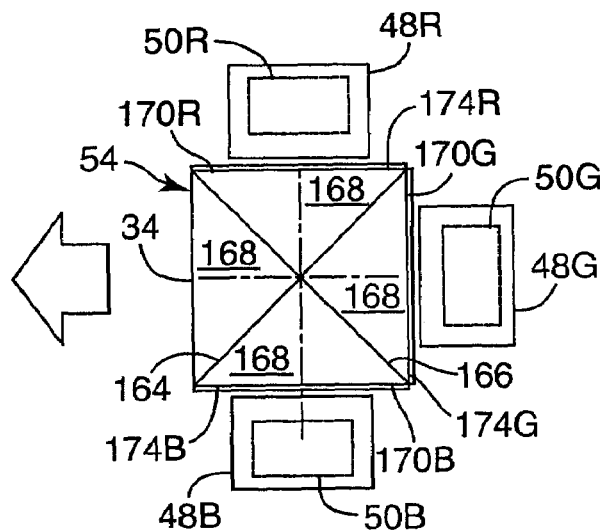
FIG. 4 is a top view of one implementation of imaging cross-dichroic.

FIG. 4 is a top view of one implementation of imaging cross-dichroic 54, which is the same as illumination cross-dichroic 26 and includes crossed dichroic coatings 164 and 166 positioned between inclined faces of a set of prisms 168. FIG. 4 illustrates positioning of wire grid PBSs 48R, 48G, and 48B adjacent incident faces 170R, 170B, and 170G, respectively. FIGS. 3 and 4 illustrate the corresponding positioning of identical optical elements for each of the three color components symmetrically about a projector centerline 172 (FIG. 1). It will be appreciated that a cold mirror could be inserted between elements of relay optics 24 to remove excess heat from projection system 10. Also, one or more additional folds can be arranged between the elements of relay optics 40 to provide alternative or better packaging.

Illumination and imaging cross-dichroics 26 and 54 are substantially identical. In one implementation cross-dichroics 26 and 54 are of an SPS-type in which dichroic coatings 142, 144, 164, and 166 reflect S-polarized light and transmit P-polarized light of selected colors. For example, coatings 142 and 164 may reflect S-polarized red light, and coatings 144 and 166 may reflect S-polarized blue light, all transmitting P-polarized green light.

Cross-dichroics 26 and 54 each include three half-wave plates, one for each color component (not shown), as is known in the art, to correlate the polarization of light through cross-dichroics 26 and 54 with the polarizations for PBSs 48R, 48G, and 48B. S- and P-polarizations are conventional nomenclature referring to a pair of orthogonal linear polarization states in which, with regard to a polarization selective dielectric film, S-polarized light can be said to "glance" off the film and P-polarized light can be said to "pierce" the film.

Accordingly, projection system 10 uses one polarization for the green channel and an orthogonal polarization for the red and blue channels. These polarizations allow use of overlapping spectrum for the blue and green channels to increase the system throughput. Overlapping spectrum between the red and green channels cannot be used due to colorimetry considerations.

In some implementations, the desired display color characteristics cannot be achieved from the color properties of cross-dichroics 26 and 54 alone. Additional color correction dichroic filters (one long-pass, and two short-pass—not shown) may be used to provide color purity. These low-cost correction filters can be inserted practically anywhere in the illumination path and might preferably be added at an illumination stop (i.e. combined function with color selective apodizing filter layer(s)).

Figure 5:
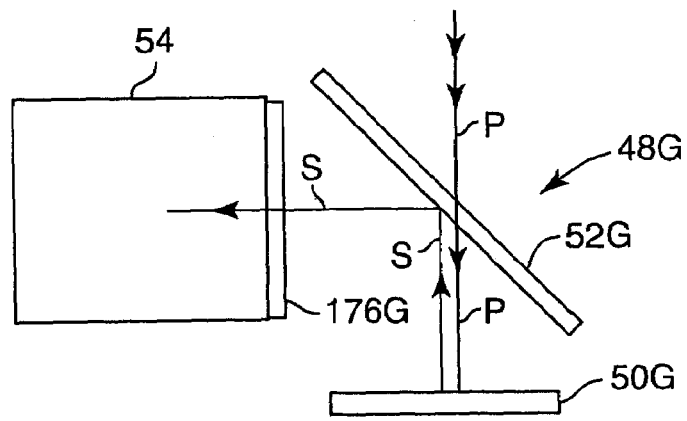
FIG. 5 is a simplified illustration of the operation of a wire grid polarizing beam splitter.

FIG. 5 is a simplified illustration of the operation of PBS 48G, for example. The operation of PBSs 48R and 48B would be analogous, but modified for the different polarization states of the red and blue color components, P-polarized green illumination light passes through a wire grid polarizer 52G, which is oriented to pass light with the P-polarization state of the green color component. The light strikes LCOS light valve 50G and is modulated according to a green color component display image and reflected as S-polarized modulated light back toward wire grid polarizer 52G. An clean-up polarizer 176G is positioned at an entrance face 174G of cross-dichroic 54 and can be a low-cost, off-the-shelf film polarizer. Measured system contrast of the optical arrangement of FIG. 5 exceeds 3200:1. This system contrast was measured with a front-surface mirror and quarter-wave plate combination substituted for LCOS light valve 50G to separate contrast of the optical arrangement from the contrast of the LCOS light valve 50G itself.

This optical arrangement of FIG. 5 does not suffer from skew-ray depolarization (so that no compensating quarter-wave plate is required), has a very high polarization extinguish ratio, works within a large temperature range, and can withstand a high light intensity. Wire grid polarizer 52G can be made on a flat glass substrate and can be used in the reflection mode in the imaging optical path as shown in FIG. 1, for example. The flatness of PBS 48G does not create significant deformation of the wavefront and provides high image quality for projector 10. Unfortunately this flat PBS 48G is too thick to be used in a transmitted mode in the imaging path: astigmatism created by this tilted plano-parallel plate is too great. This flat PBS 48G can be accepted in the illumination path of a transmitted mode.

To obtain uniform color distribution across a projection display screen (i.e., to avoid 'no color shift'), the cross-dichroics 26 and 54 should be placed in the telecentric space of the system. To obtain uniform distribution of the light on the white screen, the telecentricity should be provided in the space of integrator exit window 60. Accordingly, relay optics 26 and 40 should be telecentric in three spaces: as to integrator exit window 60, as to illumination cross-dichroic 26 and as to imaging cross-dichroic 54. With no active optical components positioned between them, imaging cross-dichroic 54 and each wire grid PBS 48 also work in the telecentric space, which also supports uniform contrast across the image on the screen.

Figure 6:
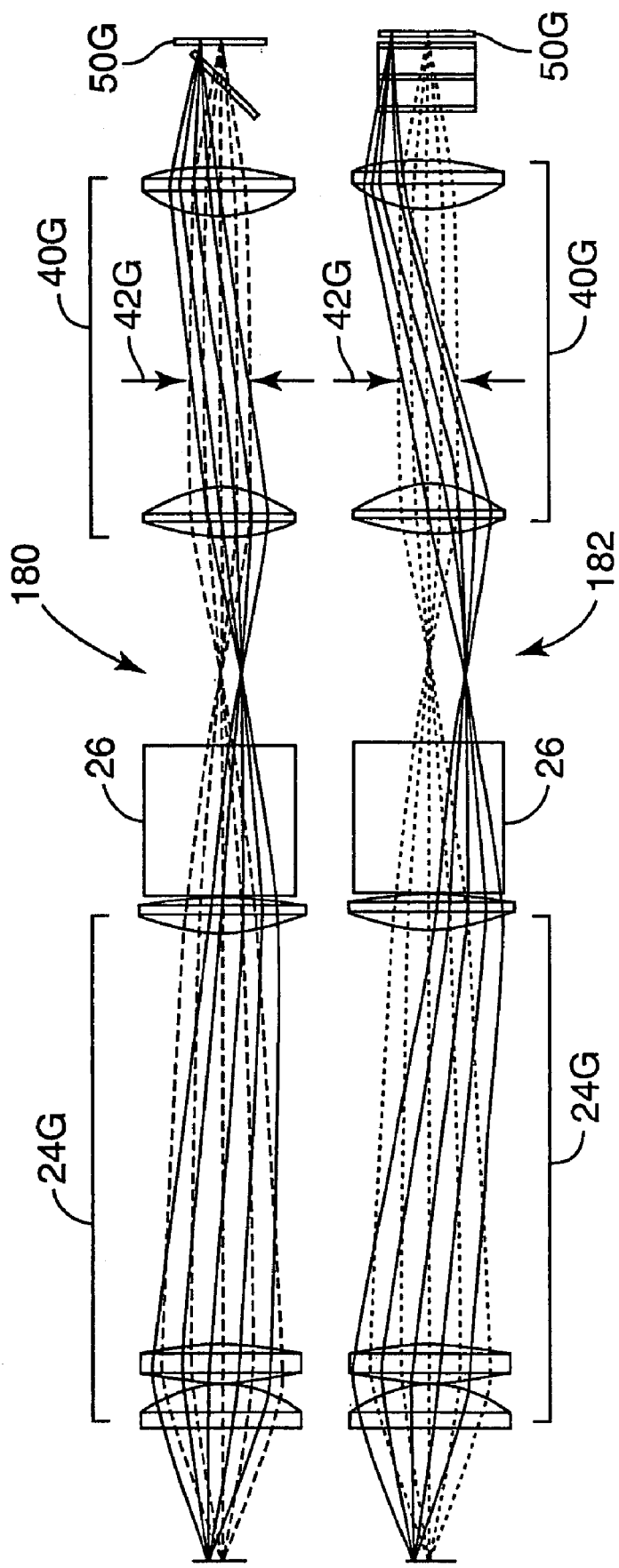
FIG. 6 is a diagram of a pair of raytracings illustrating optical rays passing through relay optics of a projector of the present invention.

FIG. 6 is a diagram of a pair of raytracings 180 and 182 illustrating optical rays passing through relay optics 24 and 40. Raytracing 180 corresponds to projection system 10 as viewed in FIG. 1. Raytracing 182 corresponds to projection system 10 as viewed from a direction 184 (FIG. 1). Raytracings 180 and 182 illustrate three regions in which relay optics 24 and 40 of projection system 10 are formed to provide telecentricity, thereby providing no color shift, uniform distribution at the white and at the dark screen across the image. As a result, projection system 10, and in particular relay optics 24 and 40, may be said to be triply telecentric.

In particular, relay optics 24 (i.e., the "target space") are formed to be telecentric to utilize and maintain brightness uniformity across the field of view. Light pipe integrator 22 provides the same angular distribution of brightness from point to point across integrator exit window 60. To provide uniform illumination across the screen the collection efficiency across pipe exit window 60 should be the same. To utilize this illumination uniformity, relay optics 24 are formed to have an entrance pupil at infinity (i.e., a telecentric entrance pupil).

Telecentricity is also maintained in the region between relay optics 24 and 40, which includes illumination cross-dichroics 26. Generally, the spectrum properties of dichroics, such as those included in cross-dichroic 26, strongly depend on angle of incidence. To avoid deviations of spectrum across the image, a phenomenon called color shift, the light in this region between relay optics 24 and 40 is provided with an identical angular structure for all points of field of view. Such an identical angular structure is another way of referring to telecentricity.

Finally, in the image space of relay optics 40G and light valve 50 telecentricity provides uniform contrast across the field of view. In other words, all points of light valves 50 are in the same conditions with respect to incoming light and, assuming good reflection surface inside the LCOS device, with respect to the outgoing light as well. With no active optical elements positioned between light valve 50 and imaging cross-dichroic 54, the telecentricity in this space also provides a no color shift condition for imaging cross-dichroic 54.

It will be appreciated that projector 10 employing LCOS light valves 50 is but one example of an electronic projection display system that can employ color balancing aperture stops in accordance with the present invention.

Figure 7:
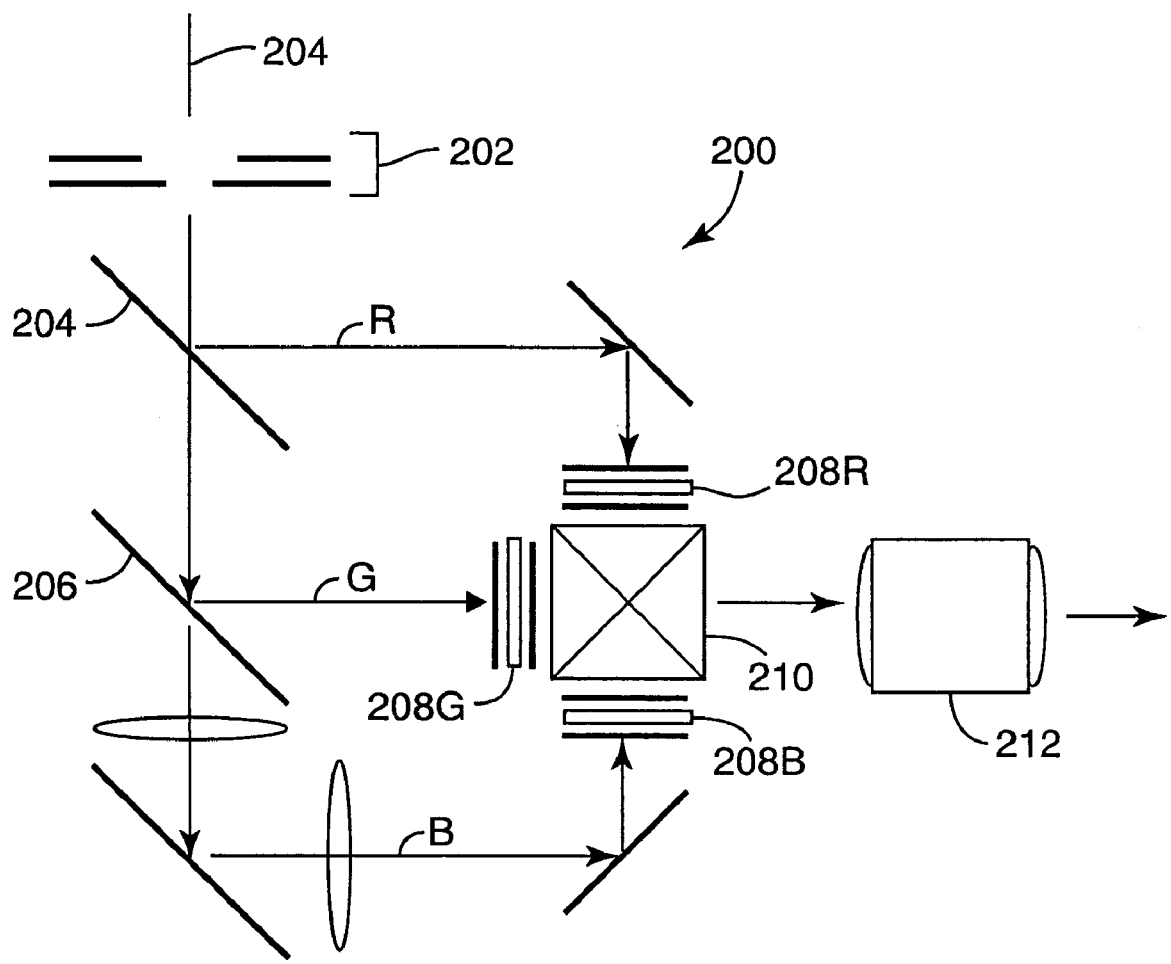
FIG. 7 is a simplified diagram of an electronic (LCD) projector in combination with a color selective apodizing aperture stop according to the present invention.

FIG. 7 is a simplified diagram of an electronic (LCD) projector 200 in combination with a color selective, color balancing aperture stop 202 according to the present invention. Electronic projector 200 receives polychromatic light 204 via color selective, color balancing aperture stop 202.

Electronic projector 200 includes a pair of color selective mirrors 204 and 206 that separate the polychromatic light 204 into color components (e.g., red, green, and blue) that are directed through respective transmissive LCD/polarizer stacks 208R, 208G, and 208B, which impart image display information into the light. A conventional X-cube 210 combines the color components with image display information and directs the combined light to a projection lens 212.

Figure 8:
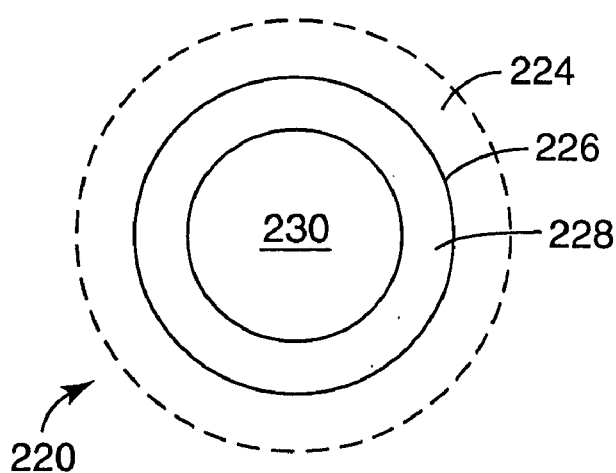
FIG. 8 is a front view of an apodizing aperture stop with a circular inner edge configuration.
Figure 9:
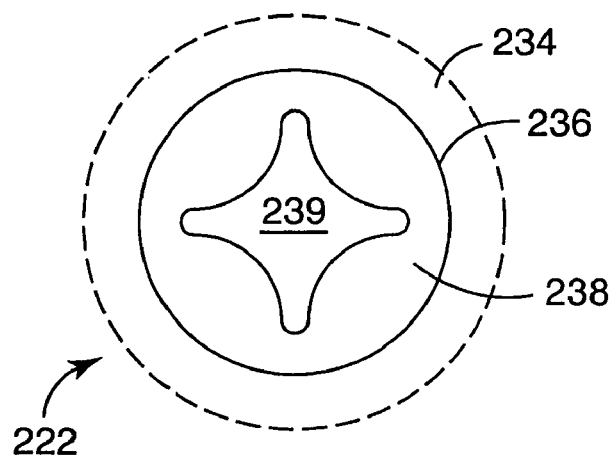
FIG. 9 is a front view of an apodizing aperture stop with a rounded cruciform inner edge configuration.

FIGS. 8 and 9 are front views of respective exemplary color selective, color balancing aperture stops 220 and 222 that may be used as aperture stop 202.

With reference to FIG. 8, aperture stop 220 includes an opaque outer annulus 224 with a circular inner edge 226. Light striking outer annulus 224 is blocked in the conventional manner of an aperture stop. A circular colored filter annulus 228 is positioned inside inner edge 226 and transmits one or two selected color bands. A central circular optical aperture 230 allows all colors of light to pass without filtering and may be a physical aperture or a transparent substrate. With the different transmissivities of circular colored filter annulus 228 and circular optical aperture 230, aperture stop 220 may be referred to as an apodizing aperture stop 220.

In one implementation, for example, the green color component of the illumination light is to be reduced relative to the red and blue components to improve the color balance. In this implementation, colored filter annulus 228 may be formed of a magenta color filter that passes red and blue light components. The red and blue light components have an aperture defined by inner edge 226, and the green component has an aperture defined by optical aperture 230. As a result, apodizing aperture stops 220 improves the color balance by selectively reducing the green component relative to the red and blue components.

With reference to FIG. 9, aperture stop 222 can provide greater improvement in image contrast if reduction of aberration effects can be less than optimal. Aperture stop 222 includes an opaque outer annulus 234 with an inner edge 236 having, for example, a circular shape. Light striking outer annulus 234 is blocked in the conventional manner of an aperture stop. A colored filter annulus 238 is positioned inside inner edge 236 and transmits one or two selected color bands corresponding to the primary color component directed through the stop (e.g., magenta). Aperture 239 can have other shapes, such as those shown in FIG. 2.

A central rounded cruciform optical aperture 239 allows light to pass without filtering and may be a physical aperture or a transparent substrate. For example, rounded cruciform optical aperture 239 and the color selective stop or color filter annulus 238 can be oriented to eliminate rays which would otherwise be incident at large compound angles, while passing rays at equal non-compound angles. With the different transmissivities of colored filter annulus 238 and cruciform optical aperture 239, aperture stop 222 may also be referred to as an apodizing aperture stop.

Aperture stops 220 and 222 function to limit, restrict, or otherwise shape the light cone (i.e., cone of illuminating light) to improve system contrast. Accordingly, the improved contrast provided by aperture stops 220 and 222 is in contradistinction to reduced contrast in conventional systems provided by relatively increased numerical apertures.

In one implementation, aperture stop 220 may be applied to narrow the intensity and angular extent of the green light relative to the red and blue components. Green light can account for up to about 80% of the RGB balance and so can predominantly contribute to the contrast of the system. Improves green contrast provided by an aperture stop 220 can improve overall system contrast.

It will be appreciated that apodized aperture stops 220 and 222 may be positioned at any other optical position in an electronic projector or projection display system, whether or not the optical position conventionally would have an aperture stop. For example, either of apodized aperture stops 220 and 222 may be positioned at a position 62 (FIG. 1) in the relay optics 24 of projection system 10 (FIG. 1) as a substitute for aperture stop 42G.

In the alternative aperture position 62 (FIG. 1), with the color components of the illumination light are not yet separated, apodized aperture stops 200 and 202 may include a color filter element for preferentially blocking one color component (e.g., green) while the other color components are passed (e.g., red and blue, or magenta). In yet other embodiments, apodized aperture stops 200 and 222 may include stacked color filter elements for preferentially blocking two color components (e.g., green and blue) by different amounts relative to the remaining color component (e.g., red).

Figure 10:
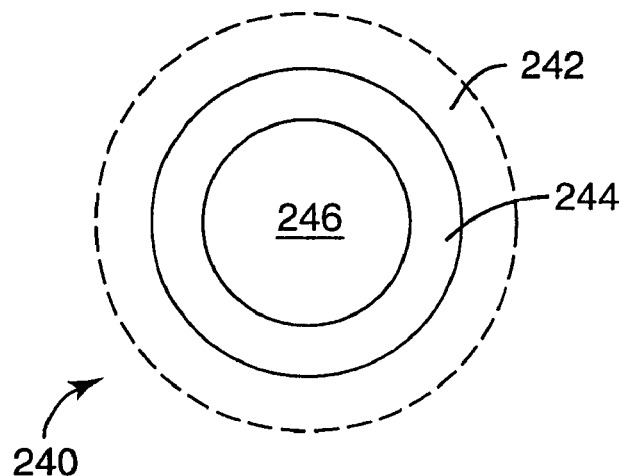
FIG. 10 is a front view of a stacked apodized aperture stop that may be used as an illumination aperture stop position.

FIG. 10 is a front view of a stacked apodized aperture stop 240 that may be used at an aperture stop position 62, for example, to preferentially block two color components (e.g., green and to a lesser degree blue) by different amounts relative to the remaining color component (e.g., red). Stacked aperture stop 240 includes a large diameter red filter annulus 242 that preferentially passes red light, an intermediate magenta filter annulus 244 that preferentially passes red and blue light, and a central optical aperture 246 that allows light to pass without filtering. Central optical aperture 246 may be a physical aperture or a transparent substrate and may be circular, as shown, or any other shape as described herein.

It will be appreciated that stacked apodized aperture stop 240 may be formed in a wide variety of color filter arrangements according to the color components to be proportionally reduced or increased. For example, stacked apodized aperture stop 240 could alternatively be formed with red filter annulus 242 omitted and magenta filter 244 extending over the annular region otherwise covered by red filter annulus 242. In addition, it will be appreciated that aperture stop 240 could further include an opaque outer annulus (not shown) of a diameter greater than magenta filter annulus 244 so that all color components, including red, are blocked at an outer extent.

Figure 11:
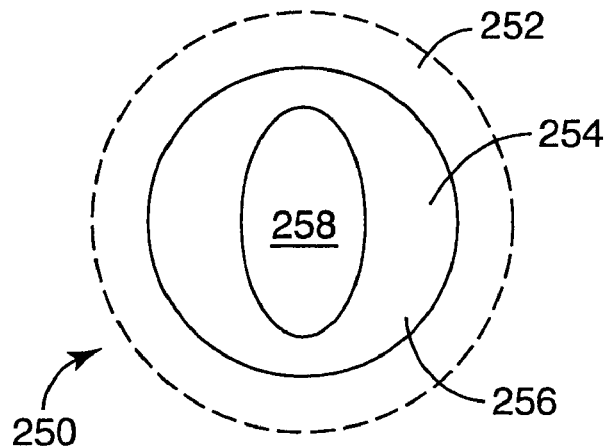
FIG. 11 is a front view of another example of a stacked apodized aperture stop.

As another example, FIG. 11 is a front view of another of a stacked apodized aperture stop 250. An opaque face 252 has a generally circular aperture 254 within which an annular magenta (i.e., red and blue) filter 256 is positioned. Annular magenta filter 256 includes an inner aperture 258 that has no color filtering. In this illustration, clear inner aperture 258 has an elliptical shape. Color selective apodizing aperture stop 250 functions to reduce the proportion of green light relative to the red and blue light.

Apodized aperture stops 200, 202, and 240, and 250 may be considered embodiments of shaped aperture stops that are shaped or sized relative to each other so as to adjust the balance of color components in a projection display system, such as projection system 10 or projection system 200. It will be appreciated, however, the apodizing of aperture stops 200, 202, and 240, and 250 with annular color filters are one manner of adjusting color component balance. Shaped aperture stops according to the present invention may alternatively be formed without the apodizing color filters of aperture stops 200, 202, and 240, and 250. In addition, it will be appreciated that apodizing color filters of aperture stops 200, 202, and 240, and 250 may be of different shapes, including having outer edges that are not circular.

Figure 12:
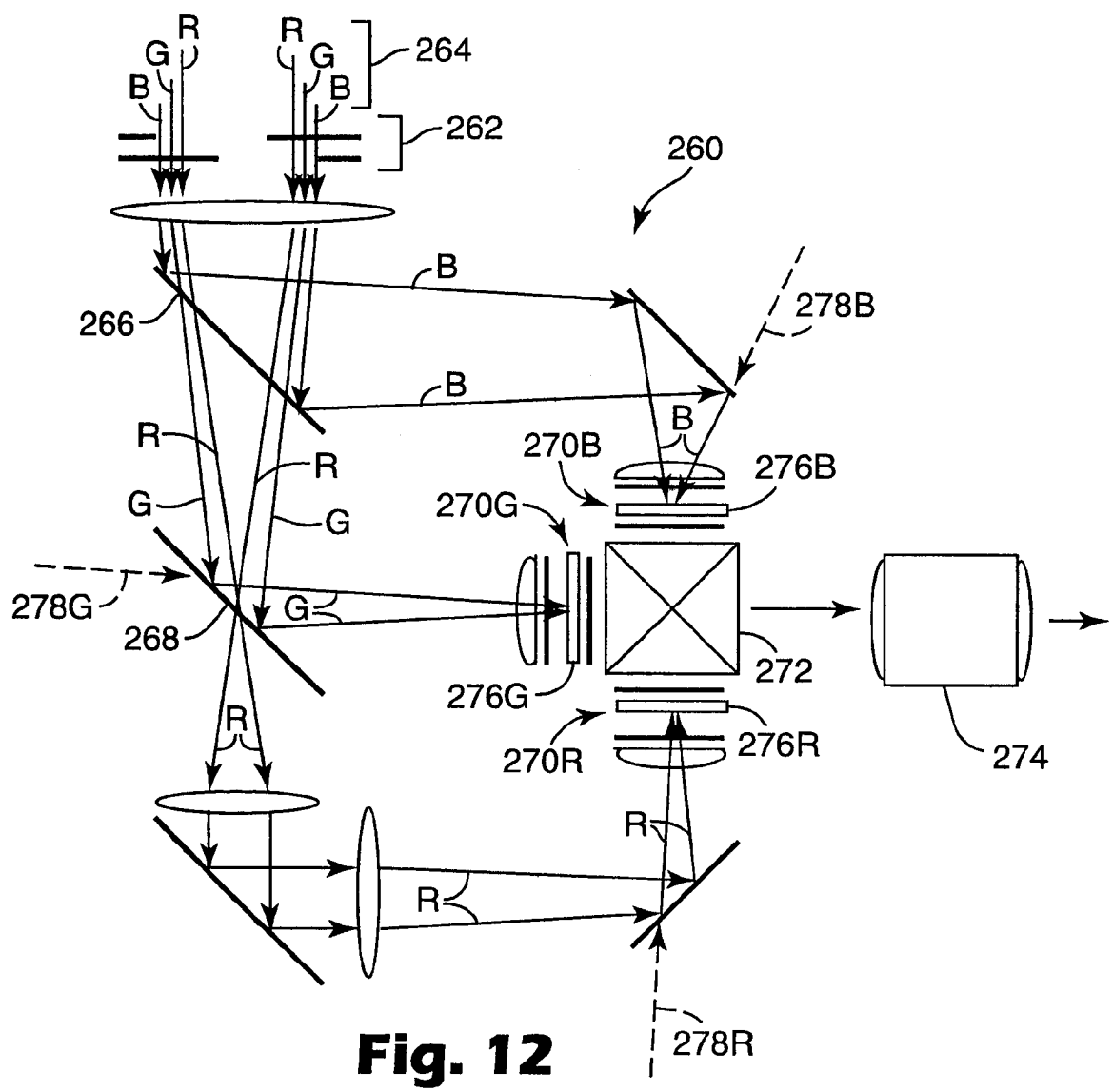
FIG. 12 is a simplified diagram of an electronic (LCD) projector with 90 degree twisted nematic LCDs in combination with a color selective apodizing aperture stop according to the present invention.
Figure 13:
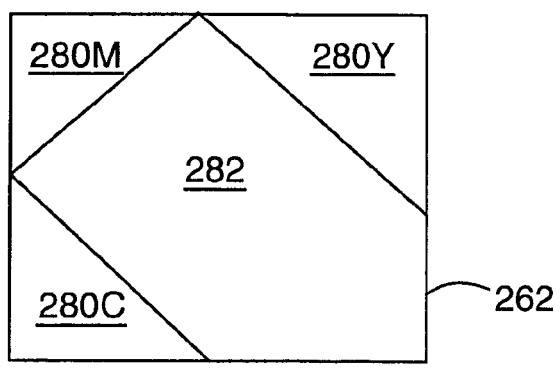
FIG. 13 is a front view of an apodizing aperture stop adapted to asymmetric contrasts of multiple twisted nematic LCDs.

FIG. 12 is a simplified diagram of an electronic (LCD) projector 260 in combination with a color selective, color balancing aperture stop 262 according to the present invention. Electronic projector 260 receives polychromatic light 264 via color selective, color balancing aperture stop 262. Color selective, color balancing aperture stop 262 is shown in greater detail in FIG. 13.

Electronic projector 260 includes a pair of color selective mirrors 266 and 268 that separate the polychromatic light 264 into color components (e.g., red, green, and blue) that are directed through respective transmissive LCD/polarizer stacks 270R, 270G, and 270B, which impart image display information into the light. A conventional X-cube 272 combines the color components with image display information and directs the combined light to a projection lens 274.

LCD/polarizer stacks 270R, 270G, and 270B include respective 90 degree twisted nematic LCDs 276R, 276G, and 276B, which characteristically have asymmetric contrasts at different viewing angles. As is known in the art, such asymmetric contrasts are commonly represented in a polar contrast plot or graph. In this implementation, display contrast can be increased by blocking angular components 278R, 278G, and 278B from the respective red, green, and blue color components of light.

It will be appreciated that the angular components 278R, 278G, and 278B are positioned throughout the respective color component light bundles. Blocking angular components 278R, 278G, and 278B provides increased contrast because the corresponding LCD has poorer performance for that angle space. The same direction respective to each of LCDs 276R, 276G, and 276B is blocked, assuming that all devices are made with same liquid crystal, rubbing angles, etc. Due to the nature of the optical layout, 278R does not appear to come from the same corner as 278G and hence the unusual color-selective aperturing used to restrict these different colored bundles so as to limit contrast-reducing light appropriately for each color channel. Aperture stop 262 blocks regions that correspond to angular components 278R, 278G, and 278B at respective LCDs 276R, 276G, and 276B.

Color selective, color balancing aperture stop 262 includes a cyan color selective filter 280C, a magenta color selective filter 280M, and a yellow color selective filter 280Y positioned in adjacent corners. An open aperture region 282 passes light of all colors. Cyan filter 280C functions to block red light, magenta filter 280M functions to block green light, and yellow filter 280Y functions to block blue light. The corners in which filters 280C, 280M, and 280Y are positioned correspond to the angular components 278R, 278G, and 278B (FIG. 12). Color selective, color balancing aperture stop 262 is adapted to the asymmetric polar contrasts of LCDs 276R, 276G, and 276B to provide increased contrast to electronic projector 260.

As an alternative implementation, projection system 10 may be formed with conventional polarizing beam splitters that employ prism structures as alternatives to wire grid PBSs 48R, 48G, and 48B. However, such conventional PBSs can be especially sensitive to 'skew rays' that reduce contrast in the system due to geometrical rotation of the polarizing axis (i.e., depolarization). In such an implementation, aperture stop 82 can reduce such skew rays by narrowing the illumination in one axis, or in two axes by clipping out the corners of a normally circular pupil.

As another implementation, the illumination light cone can be narrowed in one axis by employing a light pipe integrator 22 that is tapered in the one axis. For example, in a high definition TV (HDTV) implementation providing images with a rectangular 16:9 aspect ratio, a one-axis tapered light pipe integrator 22 could have a square entrance face to advantageously gather the light from an elliptical reflector. To provide an exit face with an appropriate 16:9 aspect ratio, the one-axis tapered light pipe integrator 22 would function to 'squeeze' the light bundle into a smaller angle. This could allow, for example, an F/2.5 vertical extent with an F/4.0 horizontal extent.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An electronic projection system, comprising:
    an illumination system generating polychromatic light with plural primary color components;
    at least one color modifying aperture stop to selectively block at least one of the primary color components of light relative to another primary color component of light to provide balance between the light components, the at least one aperture stop including an apodizing aperture stop with an annular color filter corresponding to the at least one primary color component of light;
    one or more electronic light valves that imparts or impart image information into each of the primary color components of light; and
    first and second sets of relay optics that establish three telecentric regions in the system.

2. The system of claim 1 in which the apodizing aperture stop includes a circular annular color filter.

3. The system of claim 1 in which the at least one apodizing aperture stop includes a cruciform annular color filter.

4. The system of claim 1 further including first and second sets of relay optics that establish three telecentric regions in the system.

5. The system of claim 1 in which the one or more electronic light valves include liquid crystal displays.

6. The system of claim 1 in which the one or more electronic light valves are transmissive liquid crystal displays.

7. The system of claim 1 in which the one or more electronic light valves are transmissive.

8. An electronic projection system, comprising:
    an illumination system generating polychromatic light with plural primary color components:
    at least one color modifying aperture stop to selectively block at least one of the primary color components of light relative to another primary color component of light to provide balance between the light components, the at least one aperture stop including an apodizing aperture stop with an annular color filter corresponding to the at least one primary color component of light;
    one or more electronic light valves that imparts or impart image information into each of the primary color components of light; and
    a color separation system positioned to receive the polychromatic light provided by the illumination system and to separate the polychromatic light into primary color components of light that are directed along separate primary color component light paths, the at least one color modifying aperture stop being positioned between the illumination system and the color separation system.

9. The system of claim 8 in which the apodizing aperture stop includes a circular annular color filter.

10. The system of claim 8 in which the at least one apodizing aperture stop includes a cruciform annular color filter.

11. The system of claim 8 in which the one or more electronic light valves include liquid crystal displays.

12. The system of claim 8 in which the one or more electronic light valves include transmissive liquid crystal displays.

13. The system of claim 1 in which the one or more electronic light valves are transmissive.

14. A color modifying aperture stop to selectively block a first primary color component of light relative to a second primary color component of light comprising:
    a non-circular central optical aperture with an elongated aspect ratio and selected transmissivities of the first and second primary color components of light; and
    an annular color filter corresponding to the first primary color component of light to selectively block the first primary color component of light relative to the second primary color component of light.

15. The aperture stop of claim 14 further comprising an opaque outer aperture stop that bounds the annular color filter.

16. The aperture stop of claim 15 in which the opaque outer aperture stop forms a circular boundary around the annular color filter.

17. The aperture stop of claim 15 in which the annular color filter forms a circular annulus.

18. The aperture stop of claim 14 in which the annular color filter forms a circular annulus.

19. The aperture stop of claim 14 in which the central optical aperture includes a substrate.

20. The aperture stop of claim 14 in which the central optical aperture includes a physical aperture.

* * * * *

UNITED STATES PATENT AND TRADEMARK OFFICE
CERTIFICATE OF CORRECTION

| | | |
|---|---|---|
| PATENT NO. | : 7,008,065 B2 | Page 1 of 1 |
| APPLICATION NO. | : 11/074167 | |
| DATED | : March 7, 2006 | |
| INVENTOR(S) | : R. Edward English, Jr. | |

It is certified that error appears in the above-identified patent and that said Letters Patent is hereby corrected as shown below:

On the Title Page, Col. 1, under "Related U.S. Application Data", under "(63)", line 2, delete "No. 6,877,865." and insert -- No. 6,877,865, claiming priority from provisional patent application No. 60/347,103, filed on January 7, 2002. --, therefore.

On the Second Sheet of Title Page, Col. 2, under "Other Publications" delete "Digestp." And insert -- Digest, p. --, therefor.

On the Second Sheet of Title Page, Col. 2, under "Other Publications" delete "Projecters"," and insert -- Projectors", --, therefor.

In Col. 1, line 29, delete "Colo," and insert -- Colorado, --, therefor.

In Col. 7, line 2, delete "components," and insert -- components. --, therefor.

In Col. 7, line 9, delete "An" and insert -- A --, therefor.

In Col. 12, line 41, Claim 13, delete "claim 1" and insert -- claim 8 --, therefor.

In Col. 12, line 45, Claim 14, delete "light" and insert -- light, --, therefor.

Signed and Sealed this

Second Day of October, 2007

JON W. DUDAS
*Director of the United States Patent and Trademark Office*